(12) United States Patent
Crowell (10) Patent No.: US 9,223,002 B2
(45) Date of Patent: Dec. 29, 2015

(54) SYSTEM AND METHOD FOR DETERMINING THE POSITION OF AN UNDERWATER VEHICLE

(75) Inventor: Jonathan C. Crowell, Dorchester, MA (US)

(73) Assignee: Ocean Server Technology, Inc., Fall River, MA (US)

( * ) Notice: Subject to any disclaimer, the term of this patent is extended or adjusted under 35 U.S.C. 154(b) by 2592 days.

(21) Appl. No.: 11/675,167

(22) Filed: Feb. 15, 2007

(65) Prior Publication Data

US 2009/0216444 A1    Aug. 27, 2009

Related U.S. Application Data

(60) Provisional application No. 60/776,120, filed on Feb. 23, 2006.

(51) Int. Cl.
*G01C 21/00* (2006.01)
*G01S 5/00* (2006.01)
(Continued)

(52) U.S. Cl.
CPC ............. *G01S 5/0045* (2013.01); *G01S 5/0284* (2013.01); *G01S 19/14* (2013.01); *G01S 2013/466* (2013.01)

(58) Field of Classification Search
CPC ................................. G01S 15/06; G01S 19/14
USPC ............ 701/21, 213; 367/127, 130, 131, 134; 114/312, 326, 328
See application file for complete search history.

(56) References Cited

U.S. PATENT DOCUMENTS 3,896,411 A   7/1975  Mackey et al.
5,119,341 A   6/1992  Youngberg
(Continued)

FOREIGN PATENT DOCUMENTS

JP         08-015427 A      1/1996
WO         WO 02/001248     1/2002
WO         WO2007/022233    2/2007

OTHER PUBLICATIONS

Seabed, "3010 Multi Purpose System: Seabed 3010-MP", Jul. 15, 2002, (http://webarchive.org/web20020715153703/http://www.seabed.nl/main_3010.htm).

(Continued)

*Primary Examiner* — Thomas G Black
*Assistant Examiner* — Peter D Nolan
(74) *Attorney, Agent, or Firm* — Nutter McClennen & Fish LLP (57) ABSTRACT

A system and a method are provided for determining the position of an underwater vehicle while the vehicle is operating underwater. A buoyant float stays on or near the surface of the water and is attached to the vehicle by thin tether that can include insulated wires. The vehicle moves under the water and pulls the float behind it. The float can receive a localization signal, such as a signal indicating its GPS position, and so can determine its position precisely. The position can be transmitted to the underwater vehicle over the wires located in the tether. The underwater vehicle can use sensors and/or calculations to determine the positional offset of the vehicle from the float buoy and generates its true position based on the known position of the float and the positional offset. The float can be constructed with attributes that will allow the float it operate with a greater tether length, and in turn allow the underwater vehicle to operate at greater depths. The float may also generally carry a radio system for high speed communication of signals from the vehicle while the vehicle is submerged.

24 Claims, 5 Drawing Sheets (51) Int. Cl.
*G01S 5/02* (2010.01)
*G01S 19/14* (2010.01)
*G01S 13/46* (2006.01)

(56) References Cited

U.S. PATENT DOCUMENTS

| | | | | |
|---|---|---|---|---|
| 5,140,927 | A * | 8/1992 | Tolefson | 114/244 |
| 5,291,194 | A | 3/1994 | Ames | |
| 5,331,602 | A | 7/1994 | McLaren | |
| 5,377,165 | A | 12/1994 | LaPointe et al. | |
| 5,379,034 | A * | 1/1995 | O'Connell | 340/850 |
| 5,579,285 | A | 11/1996 | Hubert | |
| 5,642,330 | A * | 6/1997 | Santopietro | 367/131 |
| 5,784,339 | A | 7/1998 | Woodsum et al. | |
| 5,790,070 | A | 8/1998 | Natarajan et al. | |
| 6,058,874 | A | 5/2000 | Glenning et al. | |
| 6,416,369 | B1 * | 7/2002 | Coakley | 440/33 |
| 6,443,383 | B1 * | 9/2002 | Stasny et al. | 242/388 |
| 6,501,704 | B2 * | 12/2002 | Nishimura | 367/130 |
| 6,532,192 | B1 * | 3/2003 | Reid | 367/127 |
| 6,657,585 | B1 * | 12/2003 | Kucik | 342/357.44 |
| 6,701,252 | B2 * | 3/2004 | Brown | 701/213 |
| 6,907,839 | B2 | 6/2005 | Kruger et al. | |
| 6,941,226 | B2 * | 9/2005 | Estep | 701/213 |
| 6,961,657 | B1 * | 11/2005 | Wernli et al. | 701/207 |
| 6,972,715 | B2 * | 12/2005 | Hollis et al. | 342/357.57 |
| 6,989,525 | B2 * | 1/2006 | Howard | 250/221 |
| 7,230,881 | B2 * | 6/2007 | Howard et al. | 367/131 |
| 7,512,036 | B2 | 3/2009 | Crowell | |
| 2002/0140599 | A1 * | 10/2002 | King | 342/357.06 |
| 2005/0058022 | A1 | 3/2005 | Kitchin et al. | |
| 2005/0180263 | A1 | 8/2005 | Lambert | |
| 2007/0014189 | A1 | 1/2007 | Basilico | |
| 2008/0037370 | A1 | 2/2008 | Crowell | |
| 2009/0196122 | A1 | 8/2009 | Crowell | |

OTHER PUBLICATIONS

International Search Report, from PCT/US06/031928, mailed Mar. 19, 2007.

International Search Report, from PCT/US07/004170, mailed Jun. 19, 2008.

Extended European Search Report issued Feb. 6, 2013 for Application No. 06801585.8 (7 Pages).

Japanese Office Action issued Sep. 6, 2011 for Application No. 2008-556367 (4 Pages).

* cited by examiner

SYSTEM AND METHOD FOR DETERMINING THE POSITION OF AN UNDERWATER VEHICLE

RELATED APPLICATIONS

This application claims priority to U.S. Provisional Patent Application Ser. No. 60/776,120, entitled System and Method for Determining the Position of an Underwater Vehicle, filed on Feb. 23, 2006, which application is hereby incorporated herein by reference in its entirety.

FIELD OF INVENTION

The present invention provides systems and methods for determining the precise position of an underwater vehicle. More particularly, one exemplary system provides a float capable of receiving a position signal, such as a GPS signal, and translates the GPS fix position offset of the underwater vehicle from the float so that the position of the underwater vehicle is known.

BACKGROUND OF THE INVENTION

Determining the position of unmanned underwater vehicles (UUV's) or autonomous underwater vehicles (AUV's) is a difficult problem as high frequency radio waves generally do not travel significant distances in water. This renders direct reception of GPS signals, which would otherwise provide good positional fixes, generally unusable. Conventional methods for determining the position of an underwater vehicle typically involve surfacing the vehicle to take a GPS fix, and then going underwater and using various sensors (Doppler velocity logs, Inertial guidance INS, ranging from acoustic buoys) and dead reckoning calculations to determine movement from the fixed position. This process both exposes the vehicle to the surface (taking it away from its mission and potentially exposing it to danger) and results in errors in positioning as errors can accumulate from the dead reckoning calculations.

There are also several schemes disclosed in the prior art that allow a buoy float to be sent to the surface from an underwater vehicle from a tether to obtain a GPS fix. These include U.S. Pat. No. 6,058,874; U.S. Pat. No. 5,379,034; U.S. Pat. No. 5,291,194; U.S. Pat. No. 5,377,165; and U.S. Pat. No. 6,907,839. Each of these patents disclose a scheme that brings some float attached by a wire up to the surface to allow a GPS and/or RF link to operate while the vehicle is below the surface. One problem with these methods is that they do not determine the position of the vehicle, but generally the position of the float. These references thus fail to address the error introduced by the offset of the float from the vehicle by its tether. In addition, longer length tethers are not described in the art. If a GPS accuracy of less than one meter is provided, and a tether used to attach the GPS float to the vehicle has a length of 10 meters, that introduces an order of magnitude error increase in the accuracy of the position fix. This becomes very important when the UUV is being used for operations such as hydrographic surveys, where a 10 meter overall accuracy is required, or mine reconnaissance and removal, where the vehicle may have to go back to the same locations several times.

SUMMARY OF THE INVENTION

The present invention describes the method and apparatus to translate a positional fix of the float to an actual position of the vehicle. In addition, some key attributes of the tether and buoy float are disclosed that make the system more reliable in operation.

In one aspect, the invention provides a method for determining the position of an underwater vehicle. A float having a receiver is tethered to the underwater vehicle. The receiver receives a signal representative of a position of the float. A position offset distance between the float and the underwater vehicle is then calculated and added to the position of the float to determine the position of the underwater vehicle. In one embodiment, calculating the position offset distance includes determining a distance between the float and the underwater vehicle, determining the depth of the underwater vehicle, and solving for the position offset distance. The position offset distance is determined in a direction of travel of the underwater vehicle, and optionally also in a direction perpendicular to the direction of travel of the underwater vehicle.

In a further aspect of the invention, a system is provided for determining the position of an underwater vehicle. The system includes a float having a receiver for receiving a position signal representing the position of float. The float is sufficiently buoyant so as to place the receiver in a position to receive the signal. A tether connects the float to the underwater vehicle and provides a communication channel between the float and the underwater vehicle. An offset calculation element is provided on at least one of the float and the underwater vehicle to provide a position offset distance between the underwater vehicle and the float. A processor can then calculate the position of the underwater vehicle by adding the position offset distance to the position of the float.

DETAILED DESCRIPTION

A system and a method are provided for determining the position of an underwater vehicle while the vehicle is operating underwater. A buoyant float stays on or near the surface of the water and is attached to the vehicle by thin tether that can include insulated wires. The vehicle moves under the water and pulls the float behind it. The float can receive a localization signal, such as a signal indicating its GPS position, and so can determine its position precisely. The position can be transmitted to the underwater vehicle over the wires located in the tether. The underwater vehicle can use sensors and/or calculations to determine the positional offset of the vehicle from the float buoy and generates its true position based on the known position of the float and the positional offset. The float can be constructed with attributes that will allow the float to operate with a greater tether length, and in turn allow the underwater vehicle to operate at greater depths.

The float may also generally carry a radio system for high speed communication of signals from the vehicle while the vehicle is submerged.

Figure 1:
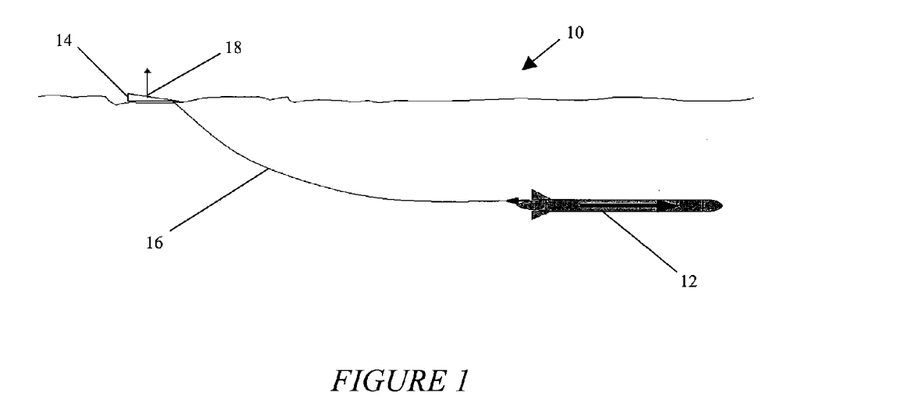
FIG. 1 provides a diagram of a system of the invention in which a vehicle pulls a small float.

Referring now to FIG. 1, a first embodiment of a system 10 of the invention for determining the position of an underwater vehicle 12 is illustrated. The system 10 includes an underwater vehicle 12, a float 14, and a tether 16 connecting the float to the underwater vehicle. The float 14 includes an antenna 18 so that it can receive a signal indicating the position of the float. The float 14 can communicate this position to the underwater vehicle 12. In addition, the underwater vehicle 12 can calculate an offset position from the float 14, so that the position of the float can be converted into a position of the vehicle. This results in a more accurate determination of the position of the vehicle when compared to systems and methods of the prior art, and allows the system to operate with tethers of greater length, thus resulting in a system that allows the underwater vehicle to travel to greater depths than conventional systems.

The float 14 can generally be of conventional construction as is known for a variety of buoys that float at or near the surface of a body of water. In general, the float contains at least an antenna 18 for receiving a signal representing the position of the float, or from which the position of the float can be calculated.

Figure 2:
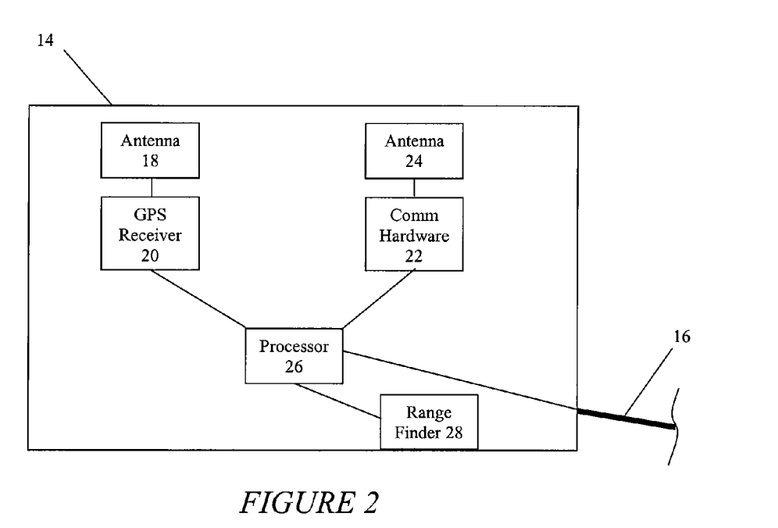
FIG. 2 provides a diagrammatic illustration of the float of FIG. 1.

In a preferred embodiment illustrated diagrammatically in FIG. 2, the float includes a receiver 20 for receiving a positioning signal, and more particularly, a GPS signal. GPS refers to the Global Positioning System, a constellation of more than two dozen GPS satellites that broadcast precise timing signals by radio to electronic GPS receivers which allow them to accurately determine their location (longitude, latitude, and altitude) in real time. GPS receivers 20 calculate their current position (latitude, longitude, elevation), and the precise time, using the process of trilateration after measuring the distance to at least four satellites by comparing the satellites' coded time signal transmissions. In general, GPS receivers 20 can be highly inaccurate, or completely inoperable, under water. For this reason, a GPS receiver (or other receiver for receiving another type of position or localization signal that cannot be accurately received under water) 20 is provided on the float so that it can be near, at, or above the surface of the water as required by the receiver and signal. In one exemplary embodiment, the receiver 20 for receiving a positional signal is a GPS receiver that can achieve a high accuracy positional fix of better than 1 meter greater than 95% of the time using simple WAAS differential corrections, such as the Garmin OEM system GPS 15L (available from Garmin International, Inc. of Olathe, Kans.).

The float 14 can also carry communications hardware 22, such as radio frequency communications hardware to send and receive communications using antenna 24. Wi-Fi (IEEE standard 802.11g, for example) is one example of low cost radio technology that is very low cost yet that can be used over distances up to a several miles with the proper antenna arrangements. A processor 26 can further be included on the float to process information and to mediate communications to and from the GPS receiver 20, the communications hardware 22, and the underwater vehicle 12 through tether 16. A range finding element 28 such as sonar or a laser range finder that operates at a suitable frequency to determine a range to the underwater vehicle 12 can also be included in on the float 14. A person of ordinary skill in the art will recognize that range finding element 28 can be placed on the float 14, on the underwater vehicle 12, or distributed between the two.

The float 14 is connected to the underwater vehicle by a tether 16. The tether 16 provides the strength required to tow the float 14, as well as a means to carry either electrical or fiber optic signals between the float and the underwater vehicle to communicate GPS or other position data, as well as for other communications, such as an RF link. The tether 16 can either be a fixed length or can be dispensed (unrolled) as required by the underwater vehicle's operating depth. The design of the float 14 and the tether 16 can be such that they resists getting caught on objects in the water and stopping the underwater vehicle 12 from propelling it self forward. It can also important for either or both of the tether 16 and float 14 that they deflect weeds or other objects floating in the water.

Figure 3:
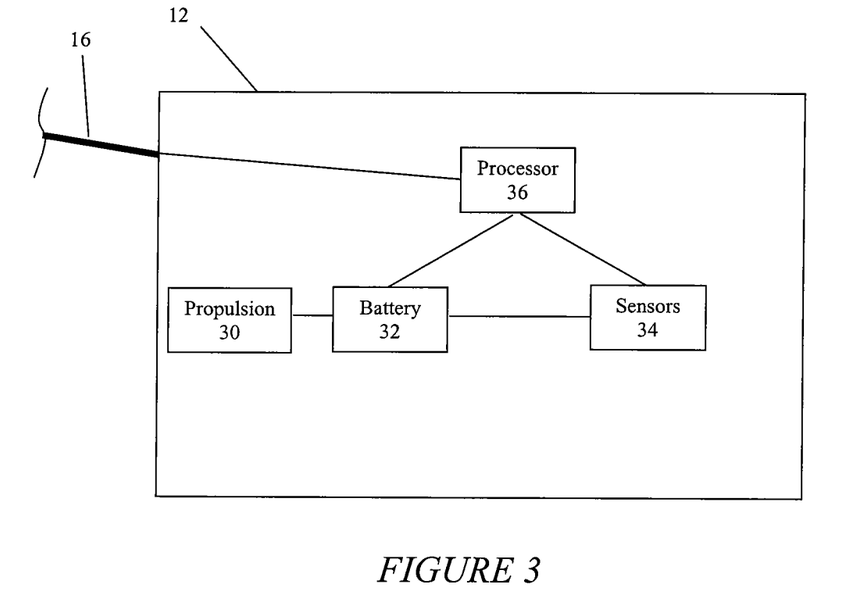
FIG. 3 provides a diagrammatic illustration of the vehicle of FIG. 1.

The underwater vehicle 12 is preferably an Autonomous Underwater Vehicle (AUV), in other words, a robot that travels underwater using its own propulsion 30. These vehicles, also known as Unmanned Undersea Vehicles (UUVs), are usually battery 32 powered and can operate in water as deep as 6000 meters. With ongoing advances in battery technology, these robotic submarines can travel further and further under their own power. Such vehicles can be used as oceanographic tools, carrying sensors 34 for navigation and/or to map features of the ocean. Typical sensors include compasses, depth sensors, sidescan and other sonars, magnetometers, thermistors and conductivity probes. There are also a number of military and security applications. A processor 36 can also be included to process information and mediate communications.

Figure 4:
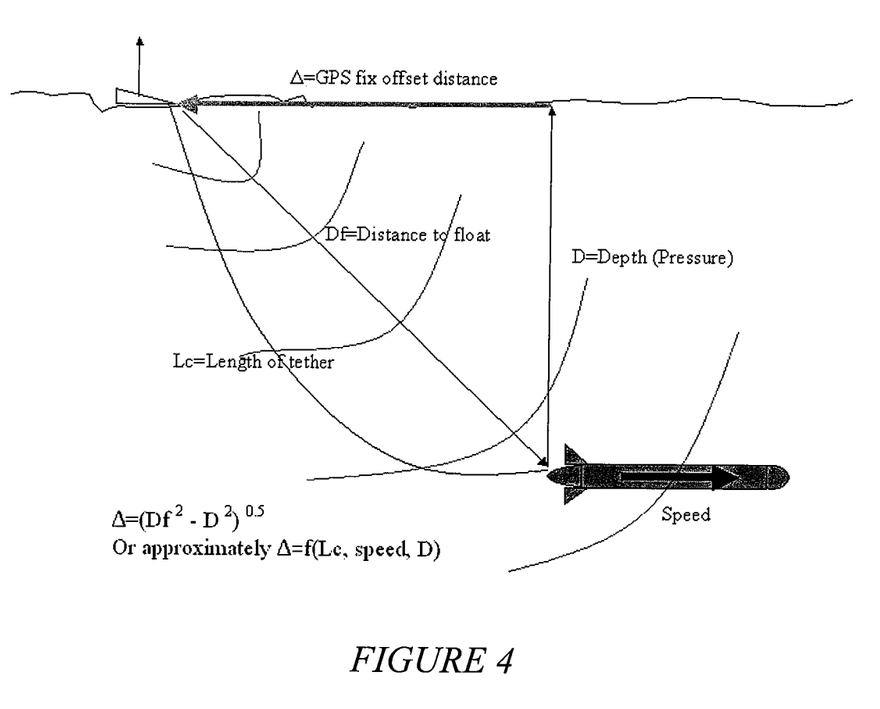
FIG. 4 illustrates the geometry of a method of the invention for determining the positional offset for the float tethered to the underwater vehicle of the system of FIG. 1.

Referring now to FIG. 4, basic calculations for finding the position offset, Delta, of the underwater vehicle 12 with respect to float 14 can be described. The offset Delta is added to the Latitude and Longitude from the GPS 20 position to provide a position that represents the actual position of the vehicle 12 and not the float 14. A processor 36 on the vehicle 12 can generate new GPS sentences representing the position of the vehicle and output them to devices on the vehicle that use GPS positioning data to geo-reference their readings such as side scan sonar recorders 34.

Calculation of the positional offset of the vehicle with respect to the float can begin with the measurement of the distance from the vehicle 12 to the float 14 ($D_f$). The measurement of distance $D_f$ in one embodiment of the invention is measured directly by commanding the float 14 to send an acoustic signal (a "sonar ping") using range finder 28; the vehicle 12 will then measure the arrival time and, knowing the speed of sound in water, can, using its processor 36, calculate the actual distance of straight line between the vehicle 12 and float 14. Another means of measuring the distance $D_f$ would be to pulse a light of a wavelength from one of the vehicle 12 or the float 14 that travels well through water and detect its arrival at the other end.

As further shown in FIG. 4, the GPS offset distance can be modeled as one leg of a right triangle. Once the distance $D_f$ is measured, the length of the hypotenuse of that right triangle is known. The vehicle can also determine its depth D very accurately by using a standard pressure transducer 34 so the length of a further leg of the right triangle is known. Now, Pythagorean's theorem can be applied by the processor 36 to solve for the length of the final leg of the triangle—the GPS offset distance Delta, or distance in the plane of the surface of the water between the float 14 and the vehicle 12. The vehicle 12 can carry a compass 34 to know it's true compass heading, so it can project the vector $D_f$ into Latitude and Longitude distance in the current datum (e.g., WGS 84, the 1984 standard of the World Geodetic System which defines a fixed global reference frame for the Earth for use in geodesy and navigation). This offset Delta can represent a primary correction to determine the corrected latitude and longitude of the vehicle 12. When the offset Delta is added to the positional fix obtained by the float 14 using its GPS receiver 20, the position of the underwater vehicle 12 is obtained precisely.

Figure 5:
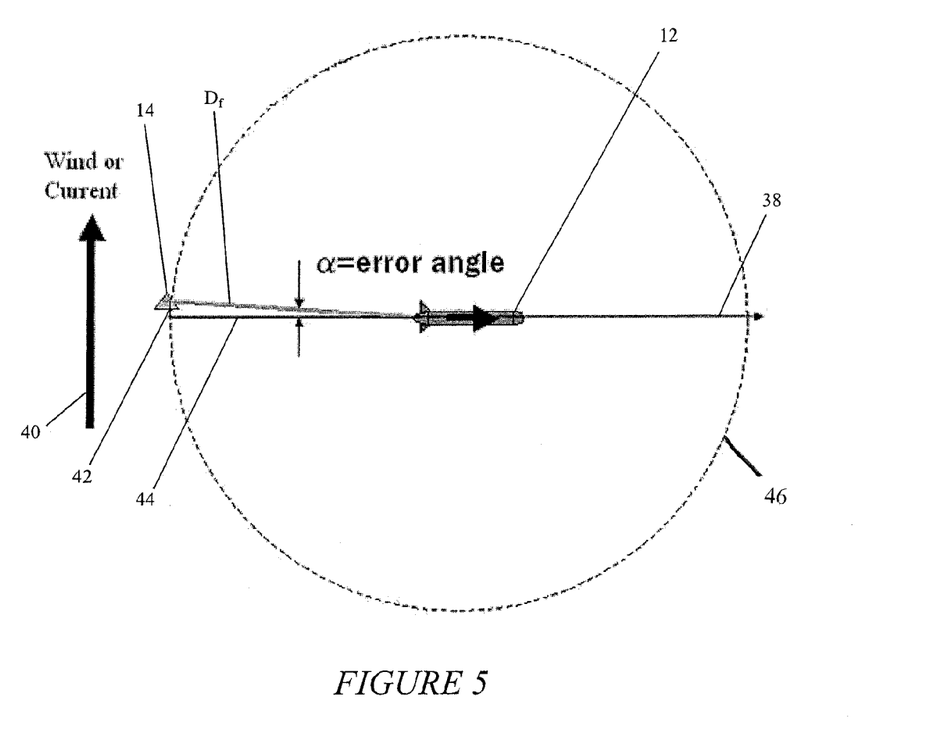
FIG. 5 illustrates the geometry of FIG. 4 from a top view, showing the float pushed off the vehicle track by angle Alpha.

Referring now to FIG. 5, an error (illustrated as error angle Alpha) can also arise if the float 14 is being pushed off the track 38 of the motion of the vehicle 12 due to a force such as wind or water current 40. This error Alpha is generally smaller than the primary offset error Delta and may be able to be ignored if desired accuracy specifications can be met without it. Alternatively, for greater accuracy, it can be corrected as described below.

As shown in FIG. 5, the distance that the float 14 is being pushed off the vehicle track 38 can be represented by a perpendicular offset 42 to the primary offset 44 from the position of the float 14 behind the vehicle 12. Where the error angle Alpha is small, the offset 42 can be modeled as the opposite leg of a right triangle formed between the vehicle 12 below the surface of the water, the actual position of the float 14 on the surface of the water, and an offset float position that is represented by the intersection of the offset 44 (which is along the vehicle track 38) and circle 46 that represents the possible positions of the float 14 on the surface of the water with respect to the vehicle 12 based on the known distance $D_f$ between the vehicle and the float. The offset vector 44 thus represents the offset of the float 14 from the vehicle 12 in the circumstance where there is no wind or current that pushes the float off track.

The length of the perpendicular leg 42 of this right triangle, and thus the second error correction for the position of the vehicle 12 with respect to the float 14 can be estimated as $D_f*\sin(Alpha)$ with the known value $D_f$ representing the hypotenuse of the triangle. The position offset in the direction of travel and perpendicular to that direction can then be solved for where Alpha is known, and the solution would be the second offset to the GPS fix on the float 14 to approximate the true position of the vehicle 12. Alpha can be measured by using a pair of transducers on the vehicle 12 receiving the transmitted acoustic signal or other range finding signal from the float 14 and recording the phase angle or onset time differences. This technique can typically detect phase angles of less than 1%. The process of determining this offset is symmetrical in terms of direction between the float 14 and the vehicle 12, so the process would work equally as well if vehicle sent the pulse and the float were the receiver.

Figure 6:
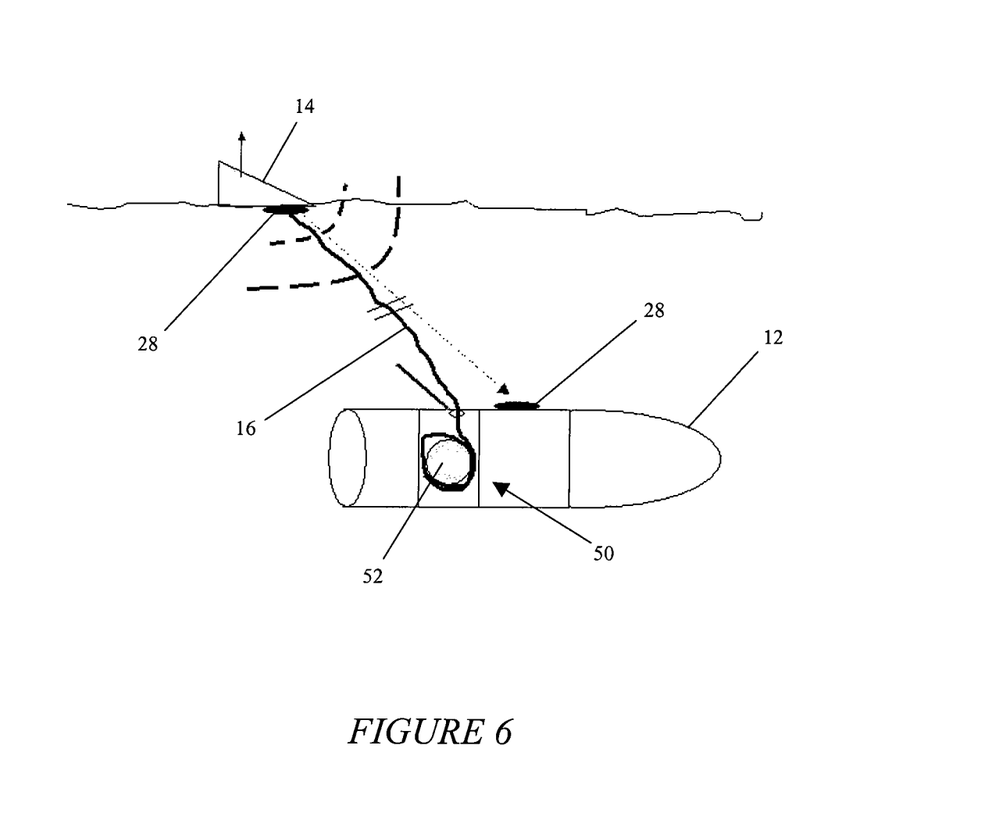
FIG. 6 illustrates a diagram of a section of a hull of an underwater vehicle of the invention having a tether feed system.

FIG. 6 illustrates a further possible embodiment of the invention. In this embodiment, the underwater vehicle 12 includes a tether 16 feed system 50. A reel 52 in the feed system 50 can pay out a measured amount of tether 16 when commanded by the vehicle 12 processor based on depth or other parameters. The Figure also shows acoustic ranging transducers 28 on the float 14 and the vehicle hull 12.

If less precision is required, a simpler system of measuring or approximating the offset Delta could be used. This could involve measuring the amount of tether 16 that has been released behind the vehicle 12. Using the speed of the vehicle 12 and some table data about how the tether 16 deflects, processor 36 can calculate a good approximation of the distance that the float 14 is behind the vehicle 12. This technique could also be used as a lower cost lower method of improving the accuracy.

The practical maximum length of the tether 16 can be determined by several factors. One of the key factors is the drag presented by the tether 16 and attached float 14. Some of the design features used to reduce the drag and generally improve the operation include:

1) Strong thin cable for tether 16: The drag on the tether cable is a function of it's diameter, thinner for lower drag. The tether also has to be very strong since it is pulling the float 14, and when the tether gets snagged, it must pull the float underwater and by the obstacle (thread through or by). The preferred tether is a multimode fiber optic cable. These have very high tensile strength typically greater than 1200 Newtons. There are standard electronic sets that pass USB protocol through the fiber; one example is the Icron USB Rover 200 (up to 50 meters of cable). Another version can run a fiber cable up to 15 km or to the bottom of the ocean.

2) Buoyancy controlled tether cable 16: The float 14 has to support the net force of gravity on the tether (cable). If you add small outline positively buoyant floats along the length of the cable or alternately add air to the insulation you can adjust the total weight of the cable/tether to be very low. This allows the float to be smaller.

3) Small sized float 14: Reduce the weight and size of the float and the resulting drag it presents to the underwater vehicle at the other end. The float must be able to self right if it gets knocked upside down as the antennas on the top must point up. The modern GPS antennas and receivers and RF radio links such as 802.11 only weigh a few ounces so the mechanical design is simpler.

4) Motorized float 14: Building the GPS float with a small propulsion system that drives the buoy forward when it senses tension in the cable will reduce the drag significantly. The motor speed control is zero when the cable tension is low and increases as the tension increases.

5) Float 14 with propulsion and direction control: The float can also have a small propulsion system to keep the float pulling in certain direction keeping the tether in tension. This can be use when the underwater vehicle must go under a surface obstruction. One relevant example is when using the underwater vehicle to do Hull inspections of ships. The float can pull back and keep from hitting the side of the ship while the vehicle goes under the ship. The control data to run the controls on the float propulsion and steering can be sent through the tether or acoustically through the water.

6) Hydrodynamic float 14 with minimal buoyancy: The float and tether should be designed to be hydrodynamic and smooth so they can be pulled around an object without the tether or float getting caught. The float should also be able to be pulled under water an thread through or around an object and quickly float back to the surface. Standard GPS receivers such as the Garmin OEM 15L are very good at losing signal and quickly re-synching with the satellites. The float should have attributes like a weaving shuttle that is used to pull yarn through a weaving without catching on anything.

7) Dynamically adjustable cable 16 length: The system can be constructed using a motorized cable feed system that will allow the system to dispense more cable as the vehicle is going to a greater depth. This will allow the cable to fly in a more optimum mode and not have too much extra cable floating on the water surface as a target for passing boats. In general the float could be run over by boats while in operation without any negative effects.

With the present invention, a rugged system of continuous GPS updates for the vehicle while it is underwater can be realized. Further, the addition of a radio transceiver to the float allows the underwater vehicle to be controlled and redirected from the surface based on real time data analysis. This could be as simple as ship hull inspections using real time Video and Sonar images to move the vehicle. In effect, one could have an improvement of the ROV (Remote Operated Vehicle) cabled vehicle without a cable between the water surface and the users data display device. Wi-Fi (IEEE standard 802.11g, for example) is an example of low cost radio technology that is very low cost yet that can be used over distances up to a several miles with the proper antenna arrangements.

Example Applications of the present invention with AUVs include:

Hydrographic surveys: An underwater vehicle outfitted with the invention can meet the accuracy requirements of NOAA for hydrographic surveys. These requirements include a horizontal accuracy of better than 10 meters. The tether can operate well in coastal areas that are shallow (less than 150 feet deep for example) where it's important to chart the depths for safe navigation. Use of the invention can also lead to an underwater vehicle that has a low enough cost that several of them could be deployed at the time to work in parallel.

Search and rescue: A vehicle equipped with the invention could be deployed rapidly, for example, to search for a drowning or other accident victim. The ability to have radio contact while the vehicle is underwater doing a video or sonar survey allows an operator to watch the high bandwidth data in real time and change the mission if the victim may have been detected. With a very accurate GPS fix of the target, an operator can send a diver down right on the spot. The vehicle could possibly be outfitted with a hook or grabber and take a hold of the victim and propel them to the surface and ashore.

Ship Hull Inspections: A vehicle of the invention could be launched to perform an inspection of a ship hull while the operator is watching video or sonar results on a Wi-Fi equipped notebook computer. The mission could be altered quickly to take a closer look at a questionable sighting. In addition, an AUV can now have the direct remote control attributes of an ROV without the cumbersome heavy tether to the ship above the water.

Environmental Monitoring: A vehicle of the invention equipped with chemical sensors could follow an exact path monitoring any body of water for changes in chemical composition, pollution or terrorist attacks. The vehicle could instantly relay the results back to operators and with the exact location of the measured data. Action could be taken before the water is allowed to flow into an intake and risk endangering people.

General purpose UUV: Using the invention in a underwater vehicle can provide the navigation position accuracy only possible using Inertial Navigation Systems and Doppler velocity logs for several orders of magnitude less cost. This could create many new uses for unmanned underwater vehicles.

A person of ordinary skill in the art will appreciate further features and advantages of the invention based on the above-described embodiments. For example, specific features from any of the embodiments described above may be incorporated into devices or methods of the invention in a variety of combinations and subcombinations, as well as features referred to in the claims below which may be implemented by means described herein. Accordingly, the invention is not to be limited by what has been particularly shown and described, except as indicated by the appended claims or those ultimately provided. Any publications and references cited herein are expressly incorporated herein by reference in their entirety.

The invention claimed is:

1. A system for determining the position of a moving autonomous underwater vehicle comprising:
a float, the float including a receiver for receiving a position signal representing the position of the float and the float being sufficiently buoyant so as to place the receiver in a position to receive the signal, and the float being towed by the moving autonomous underwater vehicle;
a tether connecting the float to the moving autonomous underwater vehicle and providing a communication channel between the float and the moving autonomous underwater vehicle; and
an offset calculation element provided on at least one of the float and the underwater vehicle to provide a position offset distance between the moving autonomous underwater vehicle and the float;
wherein the position offset distance is added to the position of the float to result in the position of the moving autonomous underwater vehicle.

2. The system of claim 1, wherein the offset calculation element includes a range finding element for sending a signal through the water between the float and the underwater vehicle and a processor configured to determine the time it takes for the signal to pass between the float and the moving autonomous underwater vehicle and to calculate the distance between the float and the moving autonomous underwater vehicle using the speed of the signal in water and the determined time.

3. The system of claim 2, wherein the range finding element is an acoustic transmitter.

4. The system of claim 2, wherein the range finding element is configured to provide a pulse of light of a wavelength suited for travel through water.

5. The system of claim 2, wherein the offset calculation element further includes a depth sensor for determining a depth of the moving autonomous underwater vehicle.

6. The system of claim 5, wherein the processor solves for the position offset distance using the depth of the moving autonomous underwater vehicle and the distance between the float and the moving autonomous underwater vehicle.

7. The system of claim 6, wherein the position offset distance is determined in a direction of travel of the moving autonomous underwater vehicle and in a direction perpendicular to the direction of travel of the moving autonomous underwater vehicle.

8. The system of claim 1, wherein the tether includes a fiber optic communication channel.

9. The system of claim 1, wherein the receiver is a GPS receiver.

10. The system of claim 1, wherein the tether length in the water is adjustable during operation by a motor and control system based on the depth of the vehicle and its speed.

11. The system of claim 1, wherein the float buoy is both hydrodynamic and smoothly shaped so that it can be pulled through obstacles without catching.

12. The system of claim 1, wherein the float buoy has a propulsion device that pushes the float based on sensing the tension between the tether and the float.

13. A method for determining the position of a moving autonomous underwater vehicle, comprising:
providing a float having a receiver tethered to the moving autonomous underwater vehicle, the float being towed by the moving autonomous underwater vehicle;
receiving on the receiver a signal representative of a position of the float;
calculating a position offset distance between the float and the moving autonomous underwater vehicle; and
adding the position offset distance to the position of the float to determine the position of the moving autonomous underwater vehicle.

14. The method of claim 13, wherein calculating the position offset distance includes:
   determining a distance between the float and the moving autonomous underwater vehicle;
   determining the depth of the moving autonomous underwater vehicle; and
   solving for the position offset distance.

15. The method of claim 13, wherein the position offset distance is determined in a direction of travel of the moving autonomous underwater vehicle and in a direction perpendicular to the direction of travel of the moving autonomous underwater vehicle.

16. The system of claim 13, wherein the angle of the float is measured to increase the accuracy of the fix offset.

17. A system for accurately determining the position of a moving vehicle located under the surface of a body of water, comprising:
   a. a buoyant float having a GPS receiver with an antenna disposed above the surface of the water, the float being towed by the vehicle;
   b. a tether having a communication channel that is connected between the underwater vehicle and the float;
   c. a range finder for measuring the distance between the float and the vehicle;
   d. a heading sensor for determining a heading for the underwater vehicle; and
   e. a processor for generating an offset for addition to a GPS fix obtained for the float to represent the position of the underwater vehicle.

18. The system of claim 17, wherein the range finder is an acoustic range finder provided on at least one of the float and the vehicle.

19. The system of claim 17, wherein the range finder is a light based range finder provided on at least one of the float and the vehicle.

20. The system of claim 17, wherein the distance measurement is performed using acoustic ranging between the float buoy and the vehicle wherein an acoustic transmitter on the float transmits a signal to an acoustic receiver on the vehicle and calculates the distance between the two and the synchronization of the transmit pulse is achieved by signaling through the tether.

21. The system of claim 17, wherein the tether comprises a fiber optic cable.

22. The system of claim 17, wherein the tether cable has added buoyancy so that its weight in water is controlled to lighten the downward pull on the float.

23. The system of claim 17, wherein the distance between the devices is calculated based on knowing the amount of tether that is un-reeled and the speed of the vehicle.

24. The system of claim 23, wherein the distance is calculated using a table based on measured experimental data.

* * * * *